United States Patent
Engholm et al.

(10) Patent No.: US 10,909,755 B2
(45) Date of Patent: Feb. 2, 2021

(54) 3D OBJECT SCANNING METHOD USING STRUCTURED LIGHT

(71) Applicant: Global Scanning Denmark A/S, Allerød (DK)

(72) Inventors: Nis Engholm, Allerød (DK); Gerard Verhaegh, Allerød (DK)

(73) Assignee: Global Scanning Denmark A/S, Allerød (DK)

( * ) Notice: Subject to any disclaimer, the term of this patent is extended or adjusted under 35 U.S.C. 154(b) by 0 days.

(21) Appl. No.: 16/425,034

(22) Filed: May 29, 2019

(65) Prior Publication Data
US 2019/0371053 A1  Dec. 5, 2019

(30) Foreign Application Priority Data
May 29, 2018 (EP) .................................. 18174872

(51) Int. Cl.
*G06T 15/00* (2011.01)
*G06T 17/05* (2011.01)
(Continued)

(52) U.S. Cl.
CPC ............... *G06T 17/05* (2013.01); *G06T 7/75* (2017.01); *G06T 7/97* (2017.01); *G06T 17/10* (2013.01);
(Continued)

(58) Field of Classification Search
CPC .. G06T 7/75; G06T 7/97; G06T 17/10; G06T 17/20
See application file for complete search history.

(56) References Cited

U.S. PATENT DOCUMENTS

2004/0218804 A1\* 11/2004 Affleck .................... C30B 7/00
382/141
2007/0206204 A1\* 9/2007 Jia ...................... G01B 11/2527
356/604
(Continued)

OTHER PUBLICATIONS

Knopf G. K. et al.: "Surface Reconstruction Using Neural Network Mapping of Range-Sensor Images to Object Space", Journal of Electronic Imaging, SPIE—International Society for Optical Engineering, US, vol. 11, No. 2, Apr. 1, 2002, pp. 187-194, XP001115911, ISSN: 1017-9909.
(Continued)

*Primary Examiner* — Charles Tseng
(74) *Attorney, Agent, or Firm* — Knobbe, Martens, Olson & Bear, LLP (57) ABSTRACT

A method of scanning a 3D object includes: receiving a user's input to perform a scanning operation via a user interface, and in response using a light projector, projecting structured light onto the surface of a physical object about target positions on the surface of the physical object; and recording a sequence of first images of at least a portion of the surface of the physical object including a light scatter region illuminated by the structured light being projected about the target positions on the surface of the physical object using a camera. A trained image processing network configured during training to output data comprising a representation of positions being estimates of the target positions on the surface of the physical object in response to receiving one or more first images can be used.

15 Claims, 4 Drawing Sheets

(51) Int. Cl.
  *G06T 7/00* (2017.01)
  *G06T 7/73* (2017.01)
  *G06T 17/10* (2006.01)
  *G06T 17/20* (2006.01)

(52) U.S. Cl.
  CPC .......... *G06T 17/20* (2013.01); *G06T 2200/04* (2013.01); *G06T 2200/08* (2013.01); *G06T 2207/10028* (2013.01)

(56) References Cited

U.S. PATENT DOCUMENTS

| | | | |
|---|---|---|---|
| 2008/0212853 A1* | 9/2008 | Lin | A61B 6/482 382/128 |
| 2013/0258060 A1 | 10/2013 | Kotake | |
| 2015/0103358 A1* | 4/2015 | Flascher | G01B 11/25 356/603 |
| 2016/0275105 A1* | 9/2016 | Lee | H04N 19/63 |
| 2018/0081062 A1* | 3/2018 | Oggier | G01S 17/42 |
| 2018/0144244 A1* | 5/2018 | Masoud | G06F 19/321 |
| 2018/0292784 A1* | 10/2018 | Nguyen | G03H 1/0005 |

OTHER PUBLICATIONS

Juan Espinal et al.: "3D Object Reconstruction Using Structured Light and Neural Networks", Electronics, Robotics and Automotive Mechanics Conference (CERMA), 2010, IEEE, Piscataway, NJ, USA, Sep. 18, 2010, pp. 74-79, XP031852939, ISBN: 978-1-4244-8149-1.

European Search Report for Application No. 19176898.5, dated Aug. 23, 2019 in 8 pages.

\* cited by examiner

3D OBJECT SCANNING METHOD USING STRUCTURED LIGHT

CROSS-REFERENCE TO RELATED APPLICATION

This application claims priority to European Patent Application No. EP 18174872 filed on May 29, 2018, the disclosure of which including the specification, the drawings, and the claims is hereby incorporated by reference in its entirety.

BACKGROUND OF THE INVENTION

Conventional 3D, three-dimensional, object scanning for non-contacting measurement of the surface geometry of an object may in some examples be based on a light projector projecting a pattern of light, such as one or more lines, onto a 3D object (a physical object) and a camera recording images of the 3D object including the pattern of light. The pattern of light, such as a line, draws on the 3D object a curve of light which corresponds to a profile of the surface geometry of 3D object.

One or more of the 3D object, the light projector and the camera may be moved by an actuator in a scanning movement to record multiple images to capture multiple projections of the light pattern on the 3D object. Thereby, the camera may output multiple images showing respective projections of the light pattern onto the 3D object. The images are then processed by a computing device to identify the positions, with respect to the image, at which the light pattern impinges on the surface of the 3D object.

A computing device then performs a triangulation method based on the positions, with respect to the image, at which the light pattern impinges on the surface of the 3D object to digitally reconstruct the surface geometry of the 3D object e.g. in the form of a point cloud or 3D model. The triangulation method requires knowledge of the distance between the camera and the light projector and the angle between them at the time when a respective image is recorded.

To obtain an accurate reconstruction of the surface geometry of the 3D object it is generally preferred, but not always necessary, to include a so-called camera model or another model which is configured for correction of optical distortion in the camera and its lens or other optical system through which the camera receives light from the 3D object.

Further, accurate reconstruction of the surface geometry of the 3D object depends on accurately identifying the positions, with respect to the image, at which the light pattern impinges on the surface of the 3D object.

Thus, accurate information of the scanning movement and location of the light pattern on the 3D object is required in order to generate point cloud or 3D model reproducing the 3D object accurately.

RELATED PRIOR ART

U.S. Pat. No. 6,205,243 discloses a system and a method for rapidly scanning an object by projecting structured light (such as laser stripes) onto the object. Using a camera to record the shape of reflected points of light from the laser stripes and a triangulation technique performed by a computer, the 3D shape of the object is reconstructed.

JUAN ESPINAL ET AL: "3D Object Reconstruction Using Structured Light and Neural Networks", ELECTRONICS, ROBOTICS AND AUTOMOTIVE MECHANICS CONFERENCE(CERMA), 2010, IEEE, 28 Sep. 2010, pages 74-79 describes a technique for modelling and 3D reconstruction of objects from line image processing and neural networks. Besides that a neural network is implemented based on reference data from laser line displacements corresponding to known object heights, image processing is performed to address the problem that a maximum intensity of the laser line is not always in the midpoint of the laser line. Sometimes the laser line is projected onto the object at an angle. Therefore the maximum intensity is on the left or the right of the midpoint. To calculate the position of the maximum intensity, a weighted arithmetic mean is used cf. FIG. 4 at page 76.

However, it is observed that the image processing, including the weighted arithmetic mean, is not sufficient to improve accuracy; at least not for all surface types of a 3D object.

Thus, accuracy in reproducing the physical object as a 3D model relies on the accuracy with which the location of the structured light can be located in the image of the object.

Generally, prior art 3D object scanners requiring structured light typically suffers from one or both of a lack of accuracy in reproducing the physical object as a 3D model and ease of use. One reason may be that the structured light impinging on the surface of object being scanned may be scattered in unpredictable ways and especially so when the surface across an area of an object varies.

The way in which light impinging on the surface of object is scattered may depend on several things such as, but not limited to: light incident angle and camera viewing angle let alone object surface properties, such as texture, shine, curvature and variations thereof at the narrow area where the structured light impinges. Further, some 3D object scanners requiring structured light may be sensitive to light from the surroundings such as sunlight, which cannot be controlled by the scanner.

To account for the structured light being scattered in unpredictable ways, 3D object scanners using structured light are often limited to one or more of: scanning of predefined types of objects having surfaces varying within a known range; the requirement of an enclosure shielding the object from light, such as sunlight, from the surroundings; and a significant configuration time and skills of a user operating the scanner to configure it—by setting of a combination of a multitude of parameters each related to different aspects of the projection and capture of the structured light—for sufficiently accurate scanning, let alone that for an object with a varying surface, e.g. a piece of art, such a configuration may not exist. One reason for the significant configuration time may be that oftentimes a significant amount of trial-and-error is required involving iterations where a one or more of a multitude of parameters are adjusted, scanning is started (possibly completed), a 3D model is rendered and then inspected to assess quality.

Even a small number of adjustable operational conditions unfortunately gives a high number of combinations which pushes especially an unexperienced user of a 3D scanner into a tedious trial-and-error process before an accurate point cloud or three-dimensional model of the surface of the physical object is accurately computed.

Also, the accuracy of a 3D model representing the physical object depends on the accuracy with which the structured light can be located.

One or more of the above limitations may be an obstacle towards providing a 3D object scanner, using structured light, which can be used by a wider range of users or across a wider range of objects.

SUMMARY

There is provided a method of scanning a 3D object, comprising:

via a user interface, receiving a user's input to perform a scanning operation and in response thereto: using a light projector, projecting structured light onto the surface of a physical object about target positions on the surface of the physical object; and using a camera arranged at a distance from the light projector and at a viewing angle with respect to the light projector, recording a sequence of first images of at least a portion of the surface of the physical object including a light scatter region illuminated by the structured light being projected at the target positions on the surface of the physical object;

retrieving a trained image processing network configured during training to output data comprising estimates of the location in the one or more first images of the target positions on the surface of the physical object in response to receiving one or more first images, including at least image intensity from the light scatter regions, in the sequence of images;

using the trained image processing network, processing first images including the light scatter regions in the sequence of images, to generate an estimate of the location in the one or more first images of the target positions on the surface of the physical object; and using triangulation, based on the estimate of the target positions on the surface of the physical object, generating a partial or complete computer-readable, point cloud or three-dimensional model of the surface of the physical object.

Thus, the estimate of the location in the one or more first images of the target positions on the surface of the physical object is input to subsequent triangulation. The trained image processing network improves the input to triangulation since the estimate of the location in the one or more first images can be provided at an improved accuracy.

In accordance with the method of scanning a 3D object, the point cloud or three-dimensional model of the surface of the physical object can be accurately computed in response to receiving the user's input to perform the scanning operation. In some aspects, the method enables accurate 3D scanning of physical objects which comprises transparent or semi-transparent portions e.g. made from glass or plastics. Experience and experiments have shown that it is very difficult even for an experienced user of a 3D scanner to obtain accurate or even useable scanning of physical objects with transparent or semi-transparent surfaces, structures or portions. However, by appropriate training of the image processing network it is possible to enable a wider group of users to perform scanning of objects with such tricky surfaces, structures or portions. Also, a user may be enabled to perform scanning of physical objects with a greater variability in surface characteristics e.g. across wider degrees of shine, glossiness, colour, porosity, etc.

The method of scanning a 3D object may proceed from receiving the user's input to perform the scanning operation to the generating of the partial or complete computer-readable, point cloud or three-dimensional model of the surface of the physical object while forgoing receiving user input manipulating operational conditions of one or both of the light projector and the camera. Thus, the user need not concern her-/himself with a time-consuming trial and error scanning process until a satisfactory result is achieved. The trained image processing network may have an ability to generalize within and/or beyond its training data, which improves the chances that a user can obtain much better scanning results compared to what (s)he could achieve at least in a first few attempts in scanning a specific physical object. This is relevant since scanning a 3D object may take a considerable amount of time to complete e.g. more than 5-30 minutes.

The method of scanning a 3D object may require, via a user interface, receiving a user's input to perform a digital reconstruction operation comprising one or more of: the retrieving a trained image processing network, the using the trained image processing network and the generating a partial or complete computer-readable, point cloud or three-dimensional model of the surface of the physical object. Since both the scanning operation and the digital reconstruction operation may be time consuming and since the operations may be performed on respective hardware devices, it may be advantageous to proceed either operation in response to receiving the user input. In either case, the user is relieved from a very time consuming task of adjusting operational conditions, typically by a trial-and-error process involving both scanning operations (time consuming) and digital reconstruction operations (also time consuming).

The trained image processing network may be configured during training to suppress an undesired effect of the light scatter regions, which are a source of erroneously offsetting the estimate of the target positions. The trained image processing network may use a combination of linear and non-linear operators.

In some embodiments the generating a partial or complete computer-readable, point cloud or three-dimensional model of the surface of the physical object comprises a process involving generating a 3D point cloud, generating a 3D mesh from the 3D point cloud, smoothing the 3D mesh and applying texture to the 3D mesh to generate a 3D model of the physical object. The texture is obtained by processing the images in the sequence of images.

In some embodiments the structured light is projected onto the surface of the physical object about progressively shifted target positions on the surface of the physical object. This may be accomplished by one or both of motorized rotation of a light projector platform supporting the light projector for angular movements and rotation of an object platform supporting the physical object for angular movements.

The structured light may be aimed at target positions on the physical object. When observing the physical object hit by the structured light, it can be observed for some surfaces that the structured light appears focussed at the target positions (strong light intensity) and with a substantially Gaussian distribution about the target positions in a direction orthogonal to a direction of the structured light, which may be a line.

A light scatter region illuminated by the structured light being projected about the target positions on the surface of the physical object may appear as one or more regular or irregular illuminated areas falling symmetrically or asymmetrically about the target positions. The target positions may correspond to a geometrical centre or 'Centre of Gravity' of the structured light, e.g. corresponding to a centre of the substantially Gaussian distribution, but disregarding, at least to some extent, the light scatter regions.

The light projector may comprise a light source such as a LED or LASER and may comprise one or more of an optical lens and a prism. The light projector may comprise a "fan laser". The light projector may comprise a laser, which emits a laser beam, and a laser line generator lens, which converts a laser beam into a uniform, straight line. The laser line generator lens may be configured as a cylinder or rod lens to focus the laser beam along one axis in order to create a line of light. The structured light may be configured as a 'dot', an array of 'dots', a matrix of 'dots' or a cloud of 'dots', a single line of light or as multiple parallel or intersecting lines. The structured light may be e.g. 'white light', 'red light', 'green light' or 'infrared light' or a combination thereof. The structured light configured as a line, appears as a line on the object from the perspective of the light projector. If the object is curved, the line appears as a curve when the perspective is different from that of the light projector. This curve can be observed in an image captured by the camera arranged at a distance from the light projector.

In some embodiments, the target positions correspond to edges of the structured light. The edges may be defined in accordance with a statistical criterion e.g. corresponding to a light intensity which is about half of the light intensity at a centre of the structured light, which may have a substantial Gaussian distribution. In some embodiments another criterion or criteria for detecting an edge may be used. The target positions may correspond to 'left edges', 'right edges', 'upper edges', 'lower edges' or a combination thereof. An advantage of using target positions at the edges of the structured light is that resolution of 3D scanning can be improved.

In one or more embodiments the steps of projecting structured light and recording a sequence of images are performed by a 3D scanner device, which may accommodate a controller. The 3D scanner device may accommodate the light projector and the camera.

The 3D scanner device may have one or both of a wired interface (e.g. in accordance with a USB standard) or wireless interface (e.g. in accordance with a Wi-Fi or Bluetooth standard) for transferring the sequence of images to a first computer (e.g. a desktop, laptop, or tablet computer or a smart phone). The sequence of images may be in accordance with a video format (e.g. a JPEG standard).

In one or more embodiments the retrieving a trained image processing network, the processing images and the generating a partial or complete computer-readable, point cloud or three-dimensional model of the surface of the object are performed by the first computer. The first computer may receive the sequence of images via the data communication link. In some embodiments the first computer is accommodated by the 3D scanner.

The camera may be configured as a colour camera e.g. an RGB camera or a grey tone camera.

The term triangulation should be construed as comprising any type of triangulation comprising determining the location of a point by forming triangles to it from known points. Triangulation comprises triangulation e.g. as used in one or more of: epipolar geometry, photogrammetry, and stereo vision. But is not limited thereto.

In some embodiments the method comprises:
correcting the first images in accordance with camera calibration data representing optical image distortion at one or both of the camera and an optical lens of the camera;
wherein the processing of the first images using the trained image processing network (306) is performed based on first images corrected in accordance with the camera calibration data.

The camera calibration data may be determined for a specific 3D scanner during the manufacture of the specific 3D scanner. Typically, this requires scanning of a known object e.g. at multiple positions of the known object. The known object may comprise a checkboard pattern on its surface as it is known in the art. Camera calibration data may alternatively be determined subsequent to the manufacture of the 3D scanner. The camera calibration data may deployed to a specific 3D scanner or another electronic device coupled to the specific 3D scanner. In some embodiments the camera calibration data are deployed to a specific 3D scanner from a cloud server or another server. As it is known in the art, camera calibration parameters may be represented by a 3-by-3 matrix (sometimes a 4-by-4 matrix) and an array of e.g. 5-by-1 distortion coefficients. Other calibration schemes may be used.

Thus, the first images may be corrected in accordance with the camera calibration data in advance of being processed using the trained image processing network.

This has the advantage that the trained image processing network or a copy of the trained image processing network, may be deployed not only to one particular 3D scanner, but rather to a batch of 3D scanners for which respective and possibly different calibration data are determined. This enables the trained image processing network to better learn accurate estimation of target positions in the first images.

In some embodiments the first images are 2D images and wherein the location, in the one or more first images of the target positions, is in accordance with a 2D representation.

The first images may be monochrome or colour images. The camera may be configured with a camera sensor in a matrix format outputting first images with columns and rows of monochrome or colour pixel values. The 2D representation may be in the format of a list of 2D coordinates e.g. referring to column and row indexes of a first image. In some aspects the 2D representation is obtained at sub-pixel accuracy. The 2D representation may alternatively or additionally be output in the format of a 2D image e.g. a binary image with only two possible pixel values. Thereby the 2D representation is encoded and available for being readily input to triangulation.

In some embodiments at least one of the first images is captured at a first time; and wherein triangulation is performed based on estimates of the location in the one or more first images of the target positions in the at least one of the first images and parameter values representing physical geometry, comprising mutual orientation and displacement, of the camera and the light projector at the time when the at least one of the first images was captured.

The target positions in the at least one of the first images is obtained by processing using the trained image processing network. The parameter values representing physical geometry of the camera and the light projector may include one or more of mutual orientation and a 2D or 3D displacement. The parameter values may include first values which remain fixed at least during scanning of a particular 3D object and second values which changes during scanning of the particular 3D object. The second values may be read or sensed by a sensor or by provided by a controller controlling scanning of the 3D object. A sensor may sense rotation of the light projector or a component thereof.

In some embodiments the trained image processing network is a classifier which segments picture elements of an image in the sequence of first images in accordance with a discriminator which distinguish some picture elements as target positions over other picture elements.

The picture elements distinguished over other picture elements as target positions is an estimate of the target positions on the surface of the physical object. The picture elements distinguished over other picture elements as target positions may be encoded with one or more unique values e.g. as a binary value in a binary image. The trained image processing network may receive images of the sequence of images as an input image and may provide segmentation by which some picture elements are distinguished as target positions in output images. The output images may have a higher resolution than the input images, which allows for sub-pixel (improved) accuracy of the estimates of the target positions which is input to triangulation. Alternatively, the output images may have lower resolution e.g. to advance processing related to the triangulation. Higher resolution images may be generated by up-sampling as it is known in the art e.g. by using Bicubic interpolation e.g. via Bicubic filters. In some embodiments other types of up-sampling are used. Up-sampling may be e.g. eight times up-sampling, four times up-sampling or at another up-sampling scale.

In embodiments wherein the trained image processing network is a classifier which segments picture elements of an image in the sequence of images, the target positions occur as segments of an image, which renders more convenient processing in generating the 3D model.

In some embodiments, the trained image processing network is a convolutional neural network, such as a deep convolutional neural network. A convolutional neural network offers highly accurate estimates of the target positions also in sub-optimal operating conditions of the light projector e.g. in situations (e.g. defined by ambient light, texture and shine of the physical object) where light scatter regions significantly distorts the light pattern and its spatial definition on the surface of the physical object. A properly trained convolutional neural network offers superior segmentation for accurate estimation of the target positions. In some embodiments, a trained image processing network comprises a Support Vector Machine, SVM.

In some embodiments the trained image processing network is a deep convolutional network with a u-net architecture comprising down-sampling and up-sampling operators. Such a trained image processing network offers a good trade-off between computational affordability and accuracy let alone for relatively small sets of training data. The convolutional network with a u-net architecture provides as its output a segmentation map e.g. in the form of an image.

In some embodiments the method comprises:
during recording of the first images in the sequence of images:
using a controller, controlling the light projector to stepwise move the structured light in a sweeping operation across an indexed range of multiple angular positions at least over the physical object;
using the controller and the camera, recording the sequence of images concurrently with the sweeping operation and associating a timestamp of an image in the sequence of images with a respective angular position;
wherein triangulation is based on angular positions associated with a respective one or more images in addition to the estimated target positions obtained by the processing of the respective one or more images using the trained image processing network.

The recording of the sequence of images is performed concurrently with the sweeping operation and enables a fast and fine resolution scanning operation.

In some embodiments the light projector comprises a light source arranged on a light projector turntable to stepwise move the structured light in the sweeping operation.

In some embodiments the physical object is arranged on a 3D object turntable which is moved across angular positions under control of a controller. The controlling the light projector (101) to stepwise move the structured light in a sweeping operation across an indexed range of multiple angular positions at least over the physical object may be initiated and performed at multiple angular positions of 3D object turntable while the 3D object maintains its position in a fixed position on the 3D object turntable. Thereby the 3D object can be scanned from multiple perspectives.

In one or more embodiments, the method comprises controlling a turntable platform supporting and rotating the object during a scanning operation about a centre axis, such as a vertical centre axis. The turntable may be accommodated by the 3D scanner or the turntable may a separate component under control of the 3D scanner or the computer.

In some embodiments the method comprises:
in advance of or as an initial step of recording of the first images in the sequence of images, comprising the projecting of structured light and recording a sequence of images:
applying scanner settings, operatively setting operating conditions for one or both of the light projector and the camera;
wherein the scanning of the 3D object is performed in accordance with the operating conditions.

The method of scanning a 3D object may proceed from receiving the user's input to perform the scanning operation to the generating of the partial or complete computer-readable, point cloud or three-dimensional model of the surface of the physical object while forgoing receiving user input manipulating operational conditions of one or both of the light projector and the camera, but in response to factory settings or calibration performed without involving a user in setting operating conditions for one or both of the light projector and the camera.

The in advance of or as an initial step of scanning of the 3D object may be detected in response to a "power-up" event or in response to the receiving a user's input to perform a scanning operation.

In some embodiments the method comprises:
in advance of or as an initial step of recording of the first images in the sequence of images, comprising the projecting of structured light and recording a sequence of images:
by means of a user interface, enabling a user to initiate a scanning operation of scanning of the 3D object and forgoing enabling adjustment of the operating conditions via the user interface at least during the scanning operation;
applying scanner settings, operatively setting operating conditions for one or both of the light projector and the camera;
wherein the scanning of the 3D object is performed in accordance with the operating conditions.

In some embodiments the user interface is void of controls for operatively setting one or both of electrical and optical working conditions for the light projector. Thus, the user is not enabled to operatively set one or both of electrical working conditions for the light projector and optical working conditions for the light projector.

In some embodiments the user interface is void of controls for operatively setting one or more of image processing parameters affecting estimates of the target positions, electrical working conditions for the light projector and optical working conditions for the light projector.

The scanner settings may be retrieved from a hardware memory associated with the controller. The settings may be received from a computer e.g. a computer displaying the user interface or a server computer remote from the computer displaying the user interface.

The user interface may be provided by hardware configured to receive user input as it is known in the art and optionally by a display. The hardware configured to receive user input may be hosted by one or both of the 3D scanner and the first computer.

In some embodiments, the method comprises forgoing enabling adjustment of the operating conditions via the user interface at all times. In some embodiments, the method comprises forgoing enabling adjustment of the operating conditions via the user interface at least in a first mode, and enabling adjustment of at least some of the operating conditions via the user interface in a second mode. A user may select the first mode or the second mode e.g. by default settings. The first mode may be preferred by less experienced users and the second mode may be preferred by experienced users.

In some embodiments the method comprises:
using data communication, requesting a server at a predefined Internet address to transmit one or more parameters of a trained image processing network for the processing of the images.

Thereby, for a first time or on an ongoing basis, a 3D scanner may download a trained image processing network, which may be updated by training to more accurately estimate target positions under a wider variety of objects.

In some embodiments the transmitting from the server computer comprises scanner settings for operatively setting one or more of electrical working conditions for the light projector and optical working conditions for the light projector. Thereby pairs of: scanner settings and parameters of a trained image processing network may be kept correspondence (to be associated with one another and applied in combination).

The server may be serve a program for downloading one or more parameters of a trained image processing network for the processing of the images to the first computer. The server may be a virtual server or a physical server. The one or more parameters of a trained image processing network for the processing of the images may be computed on a recurring basis based on training of the image processing network by a scanner manufacturer manufacturing scanners and/or software performing the method or portions thereof.

In some embodiments the method comprises:
training an image processing network based on training data to provide the trained image processing network;
wherein a training set for training the image processing network comprises:
second images obtained by scanning a multitude of physical objects during a scanning operation comprising the projection of light and the recording of images, and
respective third images obtained by applying segmentation on the input images;
enabling the image processing network for retrieval.

The segmentation may correspond to estimated target positions identified by an image processor performing image processing in response to parameters controlled by a human operator e.g. related to one or more of: image filter type, image filter kernel size, and intensity thresholds. The parameters controlled by a human operator may be set by the operator in a trial-and-error process wherein the operator uses visual inspection to control the parameters in aiming for accurate segmentation representing the target positions.

In some embodiments, the second images are obtained by scanning a physical object at a variety of scanner settings deliberately distributed within a range of production tolerances. Thereby the robustness of the 3D scanner is improved even when its hardware related parameters deviate from nominal values, but falls within production tolerances.

The training set may be divided into a set for training, validation and test as it is known in the art.

The training of the image processing network may be performed by a server computer or uploaded to a server computer for download. The trained image processing network may be enabled for retrieval e.g. by being deployed for download e.g. as a packet and/or for download with a software program for performing digital reconstruction based on images as set out above. A 3D scanner or the first computer may download a trained image processing network from the server. In some embodiments 3D scanners are configured during manufacture with a training image processing network e.g. by storing the training image processing network or parameters thereof in non-volatile memory of the 3D scanner or it may be embedded in software associated with the 3D scanner e.g. its firmware or components thereof.

In some embodiments the method comprises:
in advance of or as an initial step of recording the first images and in advance of or as an initial step of recording the second images:
applying respective scanner settings (309) for the recording the first images and in advance of or as an initial step of recording the second images, setting respective operating conditions for one or both of the light projector and the camera to operate in accordance with the respective operating conditions;
wherein at least the respective operating conditions are the same during recording the first images and during recording the second images.

By using the same scanner settings during recording the first images and during recording the second images the trained image processing network is able to more accurately estimate the target positions.

The recording of the first images may be performed each time a 3D scanner, in a group of substantially identical 3D scanners, performs the method. The recording of the second images may be performed e.g. by a manufacturer of the 3D scanners at intervals.

There is also provided a method of training an image processing network, wherein a scanning process comprises:
using a light projector, projecting structured light onto the surface of a physical object about target positions on the surface of the physical object; and
using a camera arranged at a distance from the light projector and at a viewing angle with respect to the light projector, recording a sequence of first images of at least a portion of the surface of the physical object including a light scatter region illuminated by the structured light being projected about the target positions on the surface of the physical object;
the method of training an image processing network comprising:
performing the scanning process for each physical object in a set of multiple objects to generate respective sequences of second images;
performing segmentation of picture elements associated with the second images to generate respective third images;
training an image processing network based on corresponding second images and third images and generate the trained image processing network;
enabling the image processing network for retrieval.

In some embodiments the segmentation of picture elements associated with the second images is performed using an image processor comprising one or more adjustable image filters and a quantifier with an adjustable threshold, processing at least selected images in the sequence of second images in accordance with image processing settings; wherein segmentation generates segments corresponding to estimates of the target positions; the method comprising:

by means of a user interface, enabling a user to perform visual inspection of at least some third images, modify at least some of the output images by changing the image processing settings and re-processing the at least some of the third images; and validating at least some of the third images for inclusion in a training set of images;

training an image processing network to estimate the segments, corresponding to estimates of the target positions.

The segmentation may correspond to estimated target positions identified by an image processor performing image processing in response to parameters controlled by a human operator e.g. related to one or more of: image filter type, image filter kernel size, and intensity thresholds. The parameters controlled by a human operator may be set by the operator in a trial-and-error process wherein the operator uses visual inspection to control the parameters in aiming for accurate segmentation representing the target positions.

There is also provided a scanning system, comprising:
a light projector configured to project structured light onto the surface of a physical object about target positions on the surface of the physical object;
a camera arranged at a distance from the light projector and at a viewing angle with respect to the light projector configured to record a sequence of images of at least a portion of the surface of the physical object including a light scatter region illuminated by the structured light being projected about the target positions on the surface of the physical object;
a computing device with a processor programmed to perform the method set out above in accordance with any of the embodiments and/or aspects thereof.

In some embodiments the scanning system comprises an object platform supporting the physical object for angular movements. The object platform may be a turntable.

There is also provided a respective computer program product making a computer perform the method set out above when run by a computer.

BRIEF DESCRIPTION OF THE FIGURES

A more detailed description follows below with reference to the drawing, in which.

DETAILED DESCRIPTION

Figure 1:
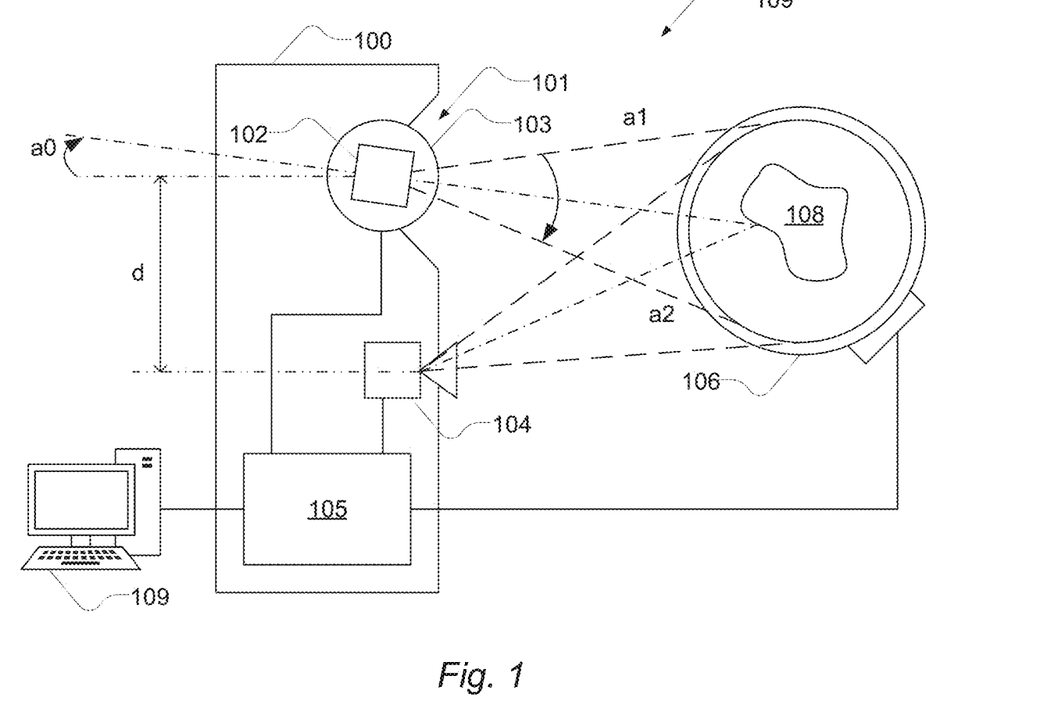
FIG. 1 shows a 3D scanner based on structured light.

FIG. 1 shows a 3D scanner system comprising a 3D scanner 100 based on structured light. The 3D scanner 100 is coupled to a first computer 109 and an object turntable 106. In some examples, the 3D scanner 100, the first computer 109 and the object turntable 106 are integrated into a single device with a common housing.

As shown, the 3D scanner 100 comprises a light projector 101 configured to project structured light onto the surface of the physical object 108 and a camera 104 arranged at a distance, d, from the light projector 101 and at a viewing angle, a0, with respect to the light projector 101. The camera 104 is configured to record a sequence of first images of at least a portion of the surface of the physical object 108. The 3D scanner also comprises a controller 105 configured to control the light projector 101, the camera 104 and the object turntable 106. The controller may be configured to communicate with the first computer 109. The first computer 109 and the controller 105 may be programmed to perform the method described herein.

For instance the controller 105 may be programmed to control a light projector turntable 103 of the light projector 101 to stepwise move the structured light in a sweeping operation across an indexed range of multiple angular positions at least over the physical object 108. The sweeping operation may extend from a first angle, a1, to a second angle, a2. In some embodiments the first angle, a1, and the second angle, a2, may be fixed, e.g. involving calibration. In some embodiments an arm, e.g. a detachable arm, or scanner body keeps a fixed or an adjustable distance between the 3D scanner 100 and the object turntable 106. The distance may be stepwise adjustable and the 3D scanner may have respective modes with respective, preconfigured values of a1 and a2.

The light projector turntable 103 may comprise a stepper motor, e.g. configured with motor steps of 1.8°, and a gear e.g. with a gear ratio of 1:50 dividing the motor steps by 50. Other motor steps and other gear ratios can be used as well. The example serves i.a. to illustrate that a scanning operation takes place at fine spatial resolution. The distance, d, between the light projector 101 and the camera may be in the range between 20 mm to 500 mm or greater. In some embodiments the distance, d, is varied e.g. by a linear actuator controlled by the controller 105 instead of or as an alternative to the angular movement of the light projector.

The indexed range of multiple angular positions may comprise a list of equidistant angles corresponding to a physical angular position of the light projector with respect to a reference point or line e.g. with respect to a position of the camera 104. The controller 105 may be programmed to record the sequence of first images concurrently with the sweeping operation and associating a timestamp of an image in the sequence of first images with a respective angular position.

For instance, the first computer 109 may be programmed to retrieve a trained image processing network, processing first images, and generating a partial or complete computer-readable, point cloud or three-dimensional model of the surface of the physical object. This is described herein in more detail.

In some embodiments the first computer 109 is a mobile electronic device such as a smart phone or tablet computer.

Figure 2:
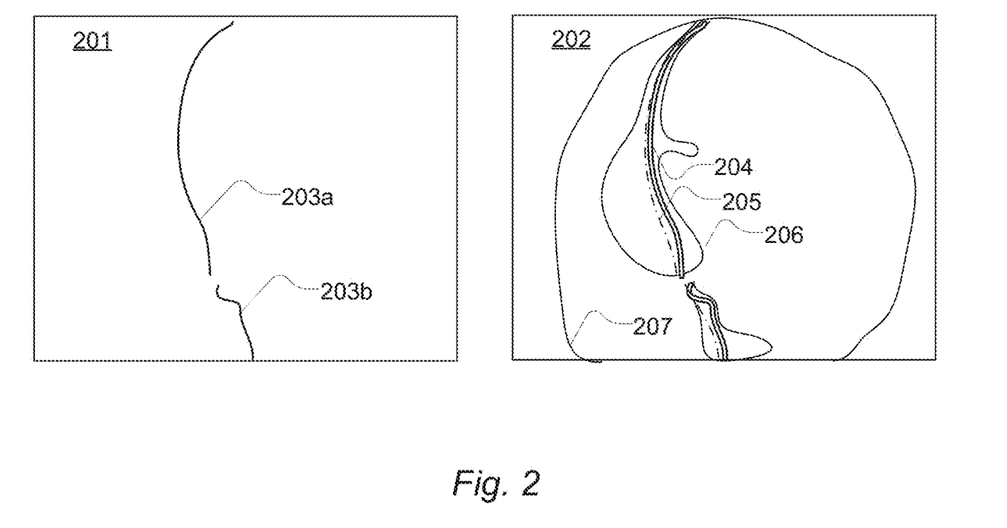
FIG. 2 illustrates an image of a 3D object.
Figure 5:
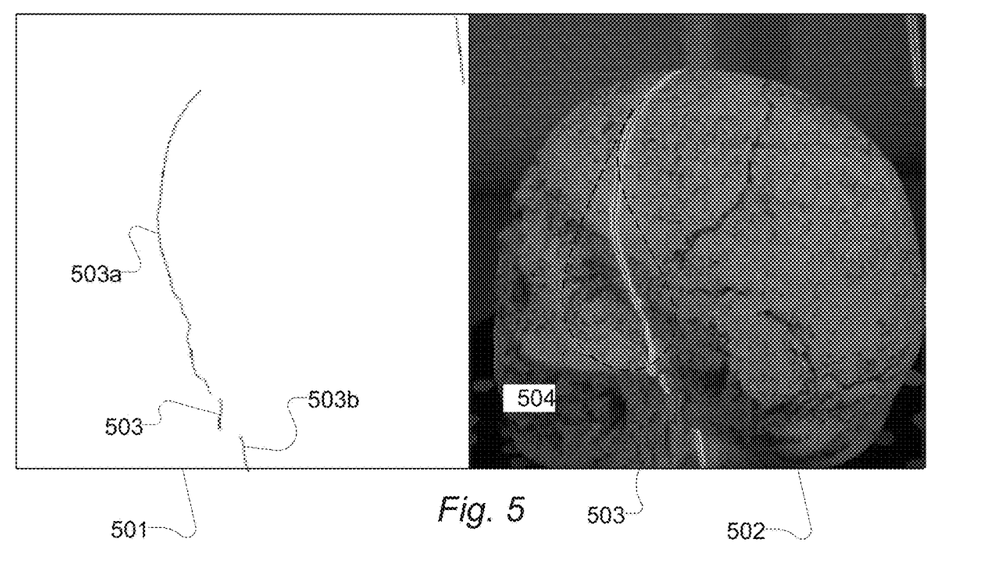
FIG. 5 shows a first example of an image of a 3D object overlaid with target positions (right) and segments which locates the estimates of the target positions in the image (left)
Figure 6:
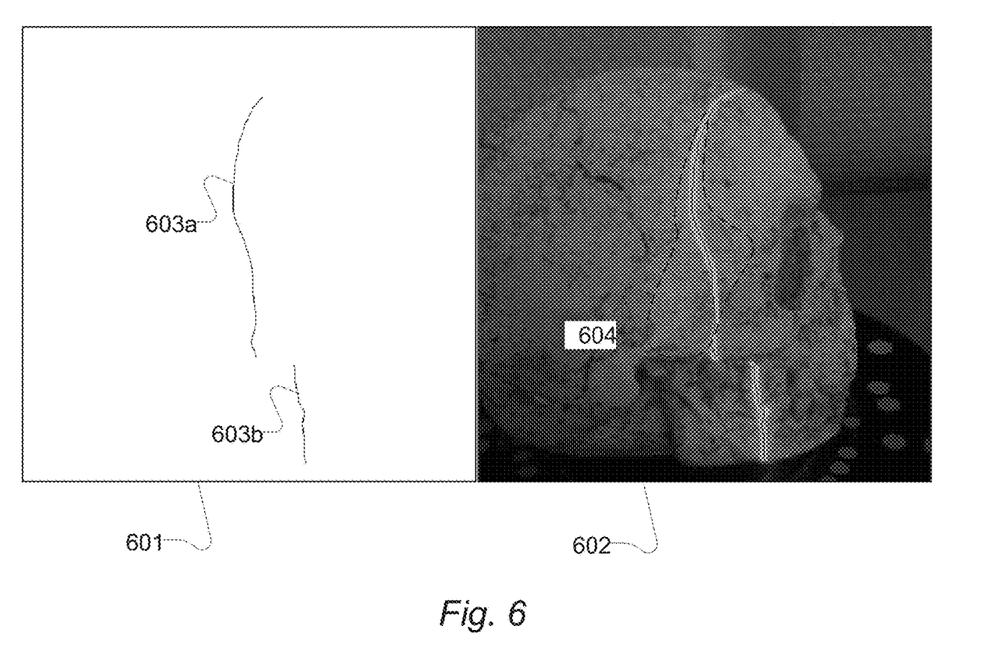
FIG. 6 shows a second example of an image of a 3D object overlaid with target positions (right) and segments which locates the estimates of the target positions in the image (left).

FIG. 2 illustrates a second image of a 3D object including a profile of light drawn on the surface of the object and a light scatter region illuminated by the structured light being projected about the target positions on the surface of the physical object. Examples thereof are shown in FIGS. 5 and 6.

On the right hand side is an example of a second image 202 coarsely represented by a contour line 207 of a physical object being scanned. The structured light appears in the image as a curve of light focussed at the curve 204 (shown by a double line). Also, the structured light appears in the image as one or more light scatter regions, here enclosed by a contour line 206. The target positions at which the light projector is aimed may occur within the curve of light focussed at the curve 204.

However, a conventional image processing approach may easily fail when one or more of: object texture, object shine and ambient light changes. The curve 205 overlaid the second image 202 represents an estimate of the target positions obtained by conventional image processing. It can easily be seen that possibly the light scatter region erroneously shifts the estimate 205 of the target positions away from the curve of light focussed at the curve 204 at which the target positions are rightly located. This leads to degraded accuracy or even ruins any meaningful reconstruction of the physical object. It is observed that it may be very difficult, albeit often clearly visible to the human eye—at least a trained human eye—to correctly estimate the target positions.

As described herein, the estimates of the target positions may be included in third images comprising segments which locates the estimates of the target positions in the image.

On the left hand side is an example of a third image 201 output by a trained image processing network. The third image comprises a first segment 203a and a second segment 203b e.g. in the form of picture elements distinguished over other picture elements in the third image. The third image may be a binary image, a grey tone image or a colour image. In some examples the third image is a bitmap image.

The segments 203a and 203b accurately matches the curve of light focussed at the curve 204 which coincides with the target positions and thus provides an accurate estimate thereof.

Figure 3:
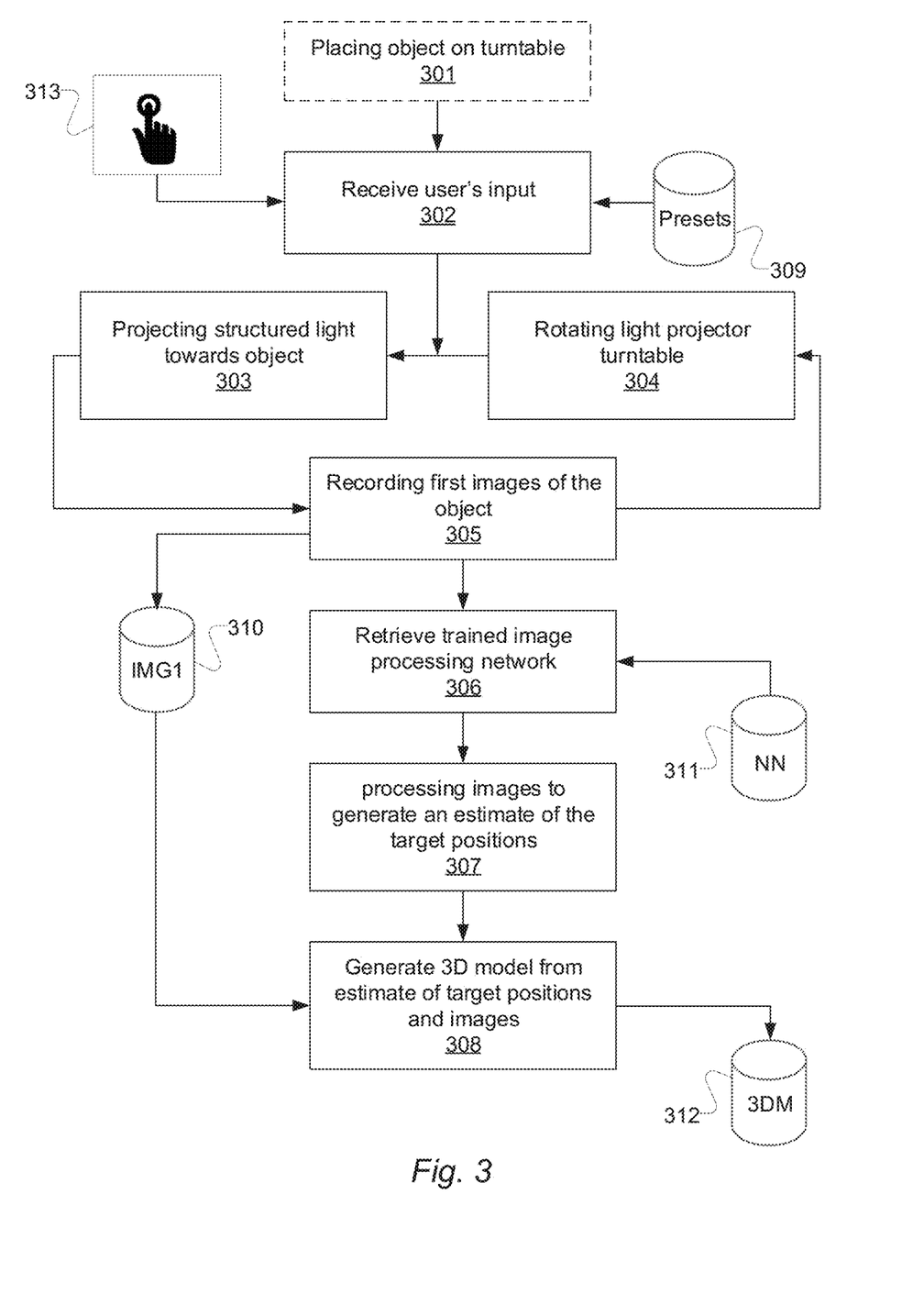
FIG. 3 shows a method of generating an accurate computer-readable 3D model of the surface of an object scanned with irregular light scatter regions varying across the surface of the object.

FIG. 3 shows a method of generating an accurate computer-readable 3D model of the surface of an object scanned with irregular light scatter regions varying across the surface of the object. Prior to performing the method, a user places an object on the object turntable 106 as illustrated by dashed box 301.

Via a user interface 313 arranged at the 3D scanner and/or at the first computer 109, the method receives at step 302 the user's input to perform a scanning operation. In response thereto the method proceeds to step 303 and uses the light projector 101 to project structured light onto the surface of the physical object about target positions on the surface of the physical object. Then, the method proceeds to step 305 and uses the camera 104 to record first images of at least a portion of the surface of the physical object 108 including any light scatter regions illuminated by the structured light being projected about the target positions on the surface of the physical object 108. Then the method may proceed to step 304 and rotates the light projector turntable to change the angle of the structured light towards the physical object. The method may proceed in such a loop until the physical object has been scanned at least from a first viewing angle. Optionally, the method may include a further loop with a step of rotating the object turntable 106 to scan the object from other angles. The first images, IMG1, are stored in image storage 310.

In some embodiments the light projector turntable is rotated in a scanning movement across the 3D object, while the object turntable stands still, and while the sequence of first images is captured e.g. in a video format. The object turntable is then rotated a predetermined angle to be at a different angle with respect to the light projector. Again, the light projector turntable is rotated in a scanning movement across the 3D object, while the object turntable stands still, and while the sequence of first images is captured e.g. in a video format. The method may proceed in this way, stepwise rotating the object turntable, until the surface of the 3D object has been scanned. The stepwise rotation may be in steps of 90 degrees or less or more. At each step, the first images may be captured as videos e.g. to capture 4 videos each at a respective angular displacement of the turntable e.g. at 0, 90, 180, 270 degrees.

Capture of the videos, or the sequence of first images, and the progressive rotation of the light projector turntable may be synchronized or associated, such that respective images in the video or the sequence of first images is associated with a respective angle of the light projector turntable. The controller is configured to handle this e.g. by starting capture of the video and rotation of the light projector turntable, from a first predefined angle, at substantially the same time. Once the light projector turntable reaches or is controlled to reach a second predefined angle video capture is stopped. Intermediate angular positions of the light projector turntable may then be associated with intermediate images of the video or sequence of first images by interpolation e.g. using a predefined video capture rate or captured time codes of the video. Each video or each sequence of the first images may be associated with a predefined angular displacement of the object platform.

When the physical object is scanned, the method proceeds to step 306 to retrieve a trained image processing network 311 configured during training to output data comprising estimates of the target positions on the surface of the physical object 108 in response to receiving one or more of the first images, including at least image intensity from the light scatter regions, in the sequence of images. The trained image processing network 311 may comprise on or more of a data file, a data packet and a software module. The trained image processing network may comprise one or more of parameters of a computational network, parameters and a processing network structure e.g. defining one or more layers and/or computational operations of the trained image processing network. The trained image processing network may be retrieved before scanning of a 3D object commences, e.g. before receiving the user's input at step 302. Retrieving the trained image processing network may include requesting from a remote server computer an updated or more recent copy of a trained image processing network.

When the trained image processing network 311 is retrieved, e.g. from a memory or storage of the controller 105 and/or the first computer 109 and/or from a remote server computer, the method proceeds to step 307 to process first images including the light scatter regions in the sequence of images, to generate an estimate of the target positions on the surface of the physical object. The estimate of the target positions may be generated as third images comprising segments which locates the estimates of the target positions in the image. Alternatively, a list of coordinates may be generated to represent the estimates of the target positions. The list of coordinates comprises 2D coordinates referring to a location in the first images. The first images, the second images and the third images are 2D images. The list of 2D coordinates may e.g. refer to column and row indexes of an image e.g. one or more of the first images. In some aspects the 2D coordinates are obtained at sub-pixel accuracy e.g. in a decimal format represented by data types of the type "real" or "integer".

The method then proceeds to step 308 to generate a partial or complete computer-readable, point cloud or three-dimensional model of the surface of the physical object based on triangulation and the estimate of the target positions on the surface of the physical object. The partial or complete computer-readable, point cloud or three-dimensional model may be stored in 3D model memory 312. The 3D model memory 312 may be a portion of the controller 105 and/or the first computer 109. The three-dimensional model may be in accordance with one or more of a so-called .OBJ format (dot-OBJ format) which defines points and triangles; a .MTL format, which defines materials; and a .PNG or .JPG format which defines texture. In some embodiments other formats are used in addition or as alternatives.

The sequence of images may be stored, at least temporarily or transiently, in image memory 310. The image memory 310 may be a portion of the controller 105 and/or the first computer 109.

The method may be completed while forgoing human intervention e.g. at least forgoing human intervention requiring input to adjust settings. In some aspects however, the method may comprise prompting the user to change the orientation of the 3D object on the turntable e.g. by placing the 3D object up-side down or by placing the 3D object to lay on its side. The method may then proceed scanning as set out above e.g. by requiring the user's input when he/she has changed the orientation of the 3D object. In this way all, or at least a larger portion, of the surface of the 3D object may be scanned.

In some aspects the method comprises requesting, at the user interface, the user to rate the generated 3D model in terms of scanning quality (fidelity). If the rating is in a predefined category, the first images are transmitted to a server computer for image processing and/or user performed segmentation for subsequently being included in a training set of images for subsequent re-training of the image processing network. Deployment of the image processing network may include the image processing network obtained by re-training. In this way, training can be performed on a larger set of images.

Figure 4:
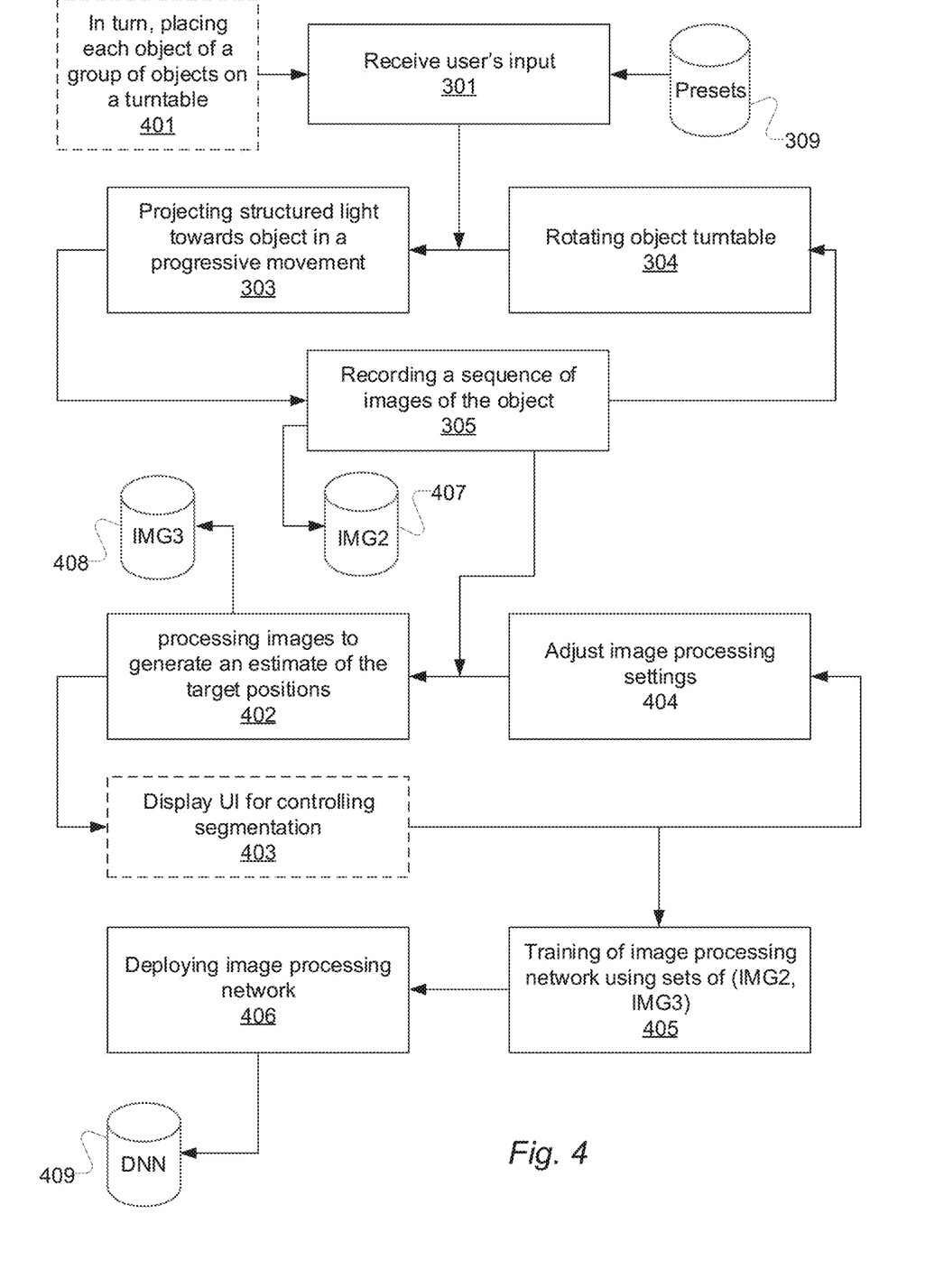
FIG. 4 shows a method of generating a trained image processing network.

FIG. 4 shows a method of generating a trained image processing network. The method of generating a trained image processing network is performed multiple times, at least one time for each object in a group of objects, as illustrated by dashed box 401. The method of generating a trained image processing network scans the object by projecting structure light and recording images in a similar way as described above e.g. in connection with steps 301, 303, 305, 304. For the sake of distinction, images recorded for the purpose of training are denoted second images, whereas images recorded in accordance with the method of FIG. 3 are denoted first images—the second images, IMG2, are stored in image storage 407. The first images, IMG1, and the second images. IMG2, may be stored at different locations or at the same location.

When the physical object is scanned, the method of generating a trained image processing network proceeds to step 402 and performs segmentation of picture elements associated with the second images to generate respective third images. The third images, IMG3, are stored in image storage 408. In some examples, the segmentation of picture elements associated with the second images is performed using an image processor comprising one or more adjustable image filters and a quantifier with an adjustable threshold, to process at least selected images in the sequence of second images in accordance with image processing settings. The segmentation generates segments corresponding to estimates of the target positions. In step 403, a user interface is displayed e.g. on a user's computer, enabling the user to perform visual inspection of at least some third images and optionally modify at least some of the third images by changing the image processing settings, cf. step 404 and re-processing the at least some of the third images.

The method may then proceed to step 405 to perform training of an image processing network to estimate the segments, corresponding to estimates of the target positions. In step 406 the trained image processing network, DNN, is enabled for retrieval e.g. by a 3D scanner. This may take place by a deployment process. The trained image processing network, DNN, is stored in storage 409. The storage 409 may be at a server accessible by the 3D scanners or it may be at a 3D scanner or a combination thereof.

In some embodiments, the 3D scanner comprises two, three, four or more cameras. When more cameras are used it is possible to obtain better spatial coverage of the physical object which may be utilized to strike a trade-off between faster scanning times and/or better estimates of the target positions when overlaps in the cameras' field-of-view are present. Then, estimates of the target positions can be determined with lower variance.

FIG. 5 shows a first example of an image of a 3D object overlaid with target positions obtained by a manual trial-and-error process (right) and segments which locates the estimates of the target positions in the image (left). The structured light clearly stands out to the human eye, but as can be seen about the structured light, light scatter regions illuminated by the structured light occurs in the image. In this example, the structured light is a red laser line.

The image 502 on the right hand side is recorded by a camera of the 3D scanner. The structured light clearly stands out to the human eye, but as can be seen about the structured light, a light scatter region, coarsely indicated by dashed curve 504, is illuminated by the structured light and occurs in the image.

The image 501 on the left hand side shows segments, picture elements, of the image 502 in accordance with a discriminator which distinguish some picture elements, in segments 503a and 503b and 503, as target positions over other picture elements. Thus, the target positions are represented, in this example, by black pixels in the left hand side image 501. When appropriately tuned, the right hand side image 502 and the left hand side image 501 may be used as training data for training the image processing network. Here however, this is not a good training example since a segment 503 is erroneously found.

FIG. 6 shows a second example of an image of a 3D object overlaid with target positions obtained by a manual trial-and-error process (right) and segments which locates the estimates of the target positions in the image (left).

The image 602 on the right hand side is recorded by a camera of the 3D scanner. The structured light clearly stands out to the human eye, but as can be seen about the structured light, a light scatter region, coarsely indicated by dashed curve 604, is illuminated by the structured light and occurs in the image. Also in this example, the structured light is a red laser line.

The image 601 on the left hand side shows segments, picture elements, of the image 602 in accordance with a discriminator which distinguish some picture elements, in segments 603a and 603b, as target positions over other picture elements. Thus, the target positions are represented, in this example, by black pixels in the left hand side image 601. When appropriately tuned, the right hand side image 602 and the left hand side image 601 may be used as training data for training the image processing network. Here however, this is also not a good training example since a segment is missing (segment 603*a* is too short) at the upper right end; that is, not all target positions are found.

It has been observed that the image processing using the trained image processing network is faster at outputting data comprising estimates of the location in the one or more first images of the target positions on the surface of the physical object, than algorithms involving thresholding, such as adaptive thresholding. One reason may be that simple thresholding algorithms for this purpose are not sufficient and that the thresholding algorithms require complex decision making, which is time consuming.

There is also provided a first item as set out below:

1. A method of scanning a 3D object, comprising:
  via a user interface (313), receiving a user's input to perform a scanning operation and in response thereto: using a light projector (101), projecting (303) structured light onto the surface of a physical object (108) about target positions on the surface of the physical object; and using a camera (104) arranged at a distance from the light projector (101) and at a viewing angle with respect to the light projector (101), recording (305) a sequence of first images of at least a portion of the surface of the physical object (108) including a light scatter region illuminated by the structured light being projected at the target positions on the surface of the physical object (108);
  retrieving (306) a trained image processing network (311) configured during training to output data comprising estimates of the target positions on the surface of the physical object (108) in response to receiving one or more first images, including at least image intensity from the light scatter regions, in the sequence of images;
  using the trained image processing network (306), processing first images including the light scatter regions in the sequence of images, to generate an estimate of the target positions on the surface of the physical object (108); wherein the first images are corrected (camera calibration: deterministic by calibration procedure) for optical distortion (not by the NN—additional step); and
  using triangulation, based on the estimate of the target positions on the surface of the physical object and geometric parameters (rotation angle of laser and/or platform) of the scanner, generating a partial or complete computer-readable, point cloud or three-dimensional model of the surface of the physical object.

There is also provided a second item as set out below:

2. A scanning system, comprising:
  a light projector configured to project structured light onto the surface of a physical object (108) about target positions on the surface of the physical object;
  a camera (104) arranged at a distance from the light projector (101) and at a viewing angle with respect to the light projector (101) configured to record a sequence of first images of at least a portion of the surface of the physical object (108) including a light scatter region illuminated by the structured light being projected about the target positions on the surface of the physical object (108);
  a computing device with a processor programmed to:
  retrieve a trained image processing network (311);
  process first images including the light scatter regions in the sequence of images, to generate an estimate of the target positions on the surface of the physical object (108);
  based on the estimate of the target positions on the surface of the physical object, generating a partial or complete computer-readable, point cloud or three-dimensional model of the surface of the physical object.

What is claimed is:

1. A method of scanning a 3D object, comprising:
  via a user interface, receiving a user's input to perform a scanning operation and in response thereto: using a light projector, projecting structured light onto the surface of a physical object about target positions on a surface of the physical object; and using a camera arranged at a distance from the light projector and at a viewing angle with respect to the light projector, recording a sequence of first images of at least a portion of the surface of the physical object including a light scatter region illuminated by the structured light being projected at the target positions on the surface of the physical object;
  training an initial image processing network based on training data to provide the trained image processing network;
  wherein a training set for training the initial image processing network comprises:
    second images obtained by scanning a multitude of physical objects during the scanning operation comprising the projection of structured light and the recording the sequence of the first images, and
    respective third images obtained by applying segmentation on the second images; and
  enabling the trained image processing network for retrieval;
  retrieving the trained image processing network configured by training to output data comprising estimates of locations, in the first images, of the target positions on the surface of the physical object in response to receiving the first images, including at least image intensity from the light scatter region, in the sequence of the first images;
  using the trained image processing network, processing the first images including the light scatter region in the sequence of the first images, to generate the estimates of the locations in the first images of the target positions on the surface of the physical object; and
  using triangulation, based on the estimates of the locations, in the first images, of the target positions on the surface of the physical object, generating a partial or complete computer-readable, point cloud or three-dimensional model of the surface of the physical object.

2. The method according to claim 1, wherein the method comprises:
  correcting the first images in accordance with camera calibration data representing optical image distortion at one or both of the camera and an optical lens of the camera;
  wherein the processing of the first images using the trained image processing network is performed based on the first images corrected in accordance with the camera calibration data.

3. The method according to claim 1, wherein the first images are 2D images and wherein the locations in the first images of the target positions on the surface of the physical object is in accordance with a 2D representation.

4. The method according to claim 1, wherein at least one of the first images is captured at a first time; and wherein the triangulation is performed based on the estimates of the locations in the first images of the target positions on the surface of the physical object in the at least one of the first images and parameter values representing physical geometry, comprising mutual orientation and displacement, of the camera and the light projector at the first time when the at least one of the first images was captured.

5. The method according to claim 1, wherein the trained image processing network is a classifier which segments picture elements of at least one image in the sequence of the first images in accordance with a discriminator which distinguish some picture elements as the target positions on the surface of the physical object over other picture elements.

6. The method according to claim 1, wherein the trained image processing network is a deep convolutional network with a u-net architecture comprising down-sampling and up-sampling operators.

7. The method according to claim 1, comprising:
during recording of the first images in the sequence of the first images:
using a controller, controlling the light projector to stepwise move the structured light in a sweeping operation across an indexed range of multiple angular positions at least over the physical object;
using the controller and the camera, recording the sequence of the first images concurrently with the sweeping operation and associating a timestamp of each image in the sequence of the first images with a respective angular position;
wherein the triangulation is based on angular positions associated with a respective one or more images from the sequence of the first images in addition to the estimates of the locations in the first images of the target positions on the surface of the physical object obtained by processing of the respective one or more images from the sequence of the first images using the trained image processing network.

8. The method according to claim 1, comprising:
in advance of or as an initial step of recording of the first images in the sequence of the first images, comprising the projecting of structured light and the recording the sequence of the first images:
applying scanner settings, operatively setting operating conditions for one or both of the light projector and the camera;
wherein the scanning of the 3D object is performed in accordance with the operating conditions.

9. The method according to claim 1, comprising:
in advance of or as an initial step of recording of the first images in the sequence of the first images, comprising the projecting of structured light and the recording the sequence of the first images:
by means of the user interface, enabling the user to initiate the scanning operation of the scanning of the 3D object and forgoing enabling adjustment of operating conditions via the user interface at least during the scanning operation;
applying scanner settings, operatively setting the operating conditions for one or both of the light projector and the camera;
wherein the scanning of the 3D object is performed in accordance with the operating conditions.

10. The method according to claim 1, comprising:
using data communication, requesting a server at a predefined Internet address to transmit one or more parameters of the trained image processing network for the processing of the first images.

11. The method according to claim 1, comprising:
in advance of or as an initial step of recording the first images and in advance of or as an initial step of recording the second images:
applying respective scanner settings for the recording the first images and in advance of or as the initial step of the recording the second images, setting respective operating conditions for one or both of the light projector and the camera to operate in accordance with the respective operating conditions;
wherein at least the respective operating conditions are identical during the recording the first images and during the recording the second images.

12. A scanning system, comprising:
a light projector configured to project structured light onto a surface of a physical object about target positions on the surface of the physical object;
a camera arranged at a distance from the light projector and at a viewing angle with respect to the light projector configured to record a sequence of images of at least a portion of the surface of the physical object including a light scatter region illuminated by the structured light being projected about the target positions on the surface of the physical object; and
a computing device with a processor programmed to perform the method according to claim 1.

13. A non-transitory computer readable medium having a program stored thereon for executing a computer to perform the method according to claim 1.

14. A method of training an image processing network, wherein a scanning process comprises:
using a light projector, projecting structured light onto a surface of a physical object about target positions on the surface of the physical object; and
using a camera arranged at a distance from the light projector and at a viewing angle with respect to the light projector, recording a sequence of first images of at least a portion of the surface of the physical object including a light scatter region illuminated by the structured light being projected about the target positions on the surface of the physical object;
the method of training the image processing network comprising:
performing the scanning process for each physical object in a set of multiple objects to generate respective sequences of second images;
performing segmentation of picture elements associated with the second images to generate respective third images;
training the image processing network based on the second images and the respective third images; and
enabling the image processing network for retrieval.

15. The method of training the image processing network according to claim 14, wherein the segmentation of the picture elements associated with the second images is performed using an image processor comprising one or more adjustable image filters and a quantifier with an adjustable threshold, processing at least selected images in the respective sequences of the second images in accordance with image processing settings; wherein the segmentation generates segments corresponding to estimates of the target positions on the surface of the physical object;
by means of a user interface, enabling a user to perform visual inspection of at least some of the respective third images, modify the at least some of the respective third images by changing the image processing settings and re-processing the at least some of the respective third images;
validating at least some of the respective third images for inclusion in a training set of images; and training the image processing network to estimate the segments corresponding to the estimates of the target positions on the surface of the physical object.

\* \* \* \* \*